(12) United States Patent
Lin

(10) Patent No.: US 12,276,295 B2
(45) Date of Patent: Apr. 15, 2025

(54) FASTENER, DRIVER BIT AND PUNCH TOOL

(71) Applicant: KWANTEX RESEARCH INC., Tainan (TW)

(72) Inventor: Chao-Wei Lin, Tainan (TW)

(73) Assignee: KWANTEX RESEARCH INC., Tainan (TW)

( * ) Notice: Subject to any disclaimer, the term of this patent is extended or adjusted under 35 U.S.C. 154(b) by 343 days.

(21) Appl. No.: 17/585,051

(22) Filed: Jan. 26, 2022

(65) Prior Publication Data

US 2023/0135213 A1 May 4, 2023

(30) Foreign Application Priority Data

Oct. 28, 2021 (TW) ................... 110140089

(51) Int. Cl.
| | | |
|---|---|---|
| *F16B 23/00* | (2006.01) | |
| *B21B 21/00* | (2006.01) | |
| *B21B 23/00* | (2006.01) | |
| *B21J 13/02* | (2006.01) | |
| *B21K 1/46* | (2006.01) | |
| *B21K 1/56* | (2006.01) | |
| *B25B 15/00* | (2006.01) | |
| *F16B 35/06* | (2006.01) | |

(52) U.S. Cl.
CPC ............ *F16B 23/0038* (2013.01); *B21K 1/56* (2013.01); *B25B 15/008* (2013.01)

(58) Field of Classification Search
CPC ......... F16B 23/0038; F16B 23/03; B21K 1/56
See application file for complete search history.

(56) References Cited

U.S. PATENT DOCUMENTS

| 2017/0095909 A1* | 4/2017 | Chen ..................... B25B 15/005 |
| 2018/0003241 A1 | 1/2018 | Goss |
| 2020/0180123 A1 | 6/2020 | Lukes et al. |

FOREIGN PATENT DOCUMENTS

| JP | 2002364619 A | * 12/2002 | ........... B25B 15/005 |
| JP | 2015180835 A | 10/2015 | |

OTHER PUBLICATIONS

English translate (JP2002364619A), retrieved date Apr. 10, 2024.*
Office Action issued to Japanese counterpart application No. 2022-037006 by the JPO on Feb. 28, 2023.
Search Report appended to an Office Action, which was issued to Taiwanese counterpart application No. 110140089 by the TIPO on Jul. 6, 2022, with an English translation thereof.

* cited by examiner

*Primary Examiner* — Mohammed S. Alawadi
(74) *Attorney, Agent, or Firm* — MUNCY, GEISSLER, OLDS & LOWE, P.C.

(57) ABSTRACT

A fastener includes a screw head and a screw shank. The screw head has a top surface and an inner surrounding surface. The inner surrounding surface has six curved portions and six driven portions disposed in an alternating arrangement. Each of the driven portions has a curved section connected to one of two adjacent curved portions and having a direction of curvature opposite to that of the one of the two adjacent curved portions, a straight section extending along a tangent line of an end of the curved section, and an extension section connected between the straight section and the other one of the two adjacent curved portions.

3 Claims, 9 Drawing Sheets

FASTENER, DRIVER BIT AND PUNCH TOOL

CROSS-REFERENCE TO RELATED APPLICATION

This application claims priority to Taiwanese Invention Patent Application No. 110140089, filed on Oct. 28, 2021.

FIELD

The disclosure relates to a fastener, a driver bit and a punch tool, and more particularly to a fastener and a driver bit that are operable to fittingly engage with each other, and a punch tool for forming the fastener.

BACKGROUND

Referring to FIG. 1, a conventional fastener 1 has a recess 11 that is formed in a top surface thereof and that is in the shape of a six-pointed star (i.e., a six-lobe recess). Due to manufacturing tolerance, the recess 11 of the conventional fastener 1 may not fittingly engage with a driver bit. When a user engages a driver bit that is attached to a power tool or a hand tool with the recess 11 of the conventional fastener 1 and turns the driver bit to tighten or loosen the conventional fastener 1, a torque exerted by the user or by the power tool may not be sufficiently transmitted to the fastener 1. Furthermore, slippage between the driver bit and the fastener 1 may occur and cause the damage of the inner wall of the recess 11 and the driver bit. It would be hard for the user to further fasten or loose the fastener. An additional tool may be needed to remove the fastener with damaged recess. Therefore, the cost and time consumption for installation would be increased. On the other hand, an outer surface of the conventional fastener 1 may be coated with a corrosion-resistant material so that the conventional fastener can be used in a harsh environment. However, the corrosion-resistant material may accumulate in the recess 11 to adversely affect the engagement between the driver bit and the recess 11 of the conventional fastener 1. The driver bit would wobble during the installation of the fastener 1 or be even unable to engage with the recess 11 of the conventional fastener 1—depending on the degree of the accumulation of the corrosion-resistant material.

SUMMARY

Therefore, an object of the disclosure is to provide a fastener that can alleviate at least one of the drawbacks of the prior art.

According to the disclosure, the fastener includes a screw head and a screw shank. The screw head has a top surface, and an inner surrounding surface that is connected to the top surface. The inner surrounding surface defines a recess that is recessed from the top surface. The inner surrounding surface has six curved portions and six driven portions that are disposed about a central axis of the fastener in an alternating arrangement. Each of the driven portions has two opposite ends that are respectively connected to two of the curved portions adjacent to the driven portion. Each of the driven portions has a curved section that is connected to one of the two adjacent curved portions and that has a direction of curvature opposite to that of the one of the two adjacent curved portions, a straight section that extends along a tangent line of an end of the curved section distal from the one of the two adjacent curved portions, and an extension section that is connected between the straight section and the other one of the two adjacent curved portions. The screw shank extends downwardly from the screw head. An outer surrounding surface of the screw shank is formed with a thread that helically extends along the screw shank.

Another object of the disclosure is to provide a driver bit that can alleviate at least one of the drawbacks of the prior art.

According to the disclosure, the driver bit includes a connecting portion and a driver head. The driver head extends downwardly from the connecting portion. The driver head has six curved portions and six driving portions that are disposed about a central axis of the driver bit in an alternating arrangement. Each of the driving portions has two opposite ends respectively connected to two of the curved portions that are adjacent to the driving portion. Each of the driving portions has a curved section that is connected to one of the two adjacent curved portions and that has a direction of curvature opposite to that of the one of the two adjacent curved portions, a straight section that extends along a tangent line of an end of the curved section distal from the one of the two adjacent curved portions, and an extension section that is connected between the straight section and the other one of the two adjacent curved portions.

Another object of the disclosure is to provide a punch tool that can alleviate at least one of the drawbacks of the prior art.

According to the disclosure, the punch tool includes a main body and a punch head. The punch head extends downwardly from the main body. The punch head has six curved portions and six convex portions that are disposed about a central axis of the punch tool in an alternating arrangement. Each of the convex portions has two opposite ends respectively connected to two of the curved portions that are adjacent to the convex portion. Each of the convex portions has a curved section that is connected to one of the two adjacent curved portions and that has a direction of curvature opposite to that of the one of the two adjacent curved portions, a straight section that extends along a tangent line of an end of the curved section distal from the one of the two adjacent curved portions, and an extension section that is connected between the straight section and the other one of the two adjacent curved portions.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
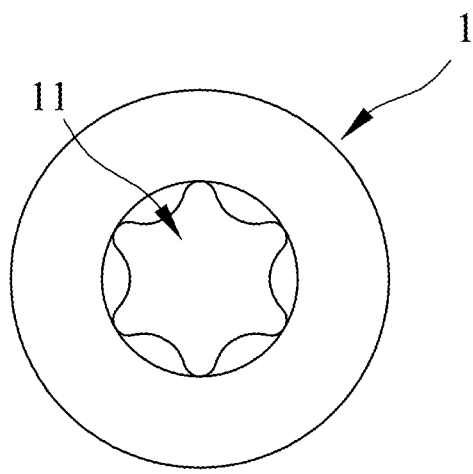
FIG. 1 is a top view illustrating a conventional fastener.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
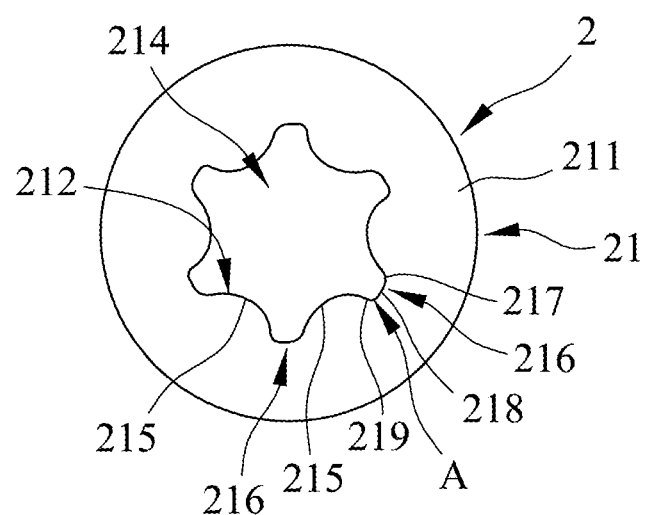
FIG. 2 is a top view illustrating an embodiment of the fastener according to the disclosure.
Figure 3:
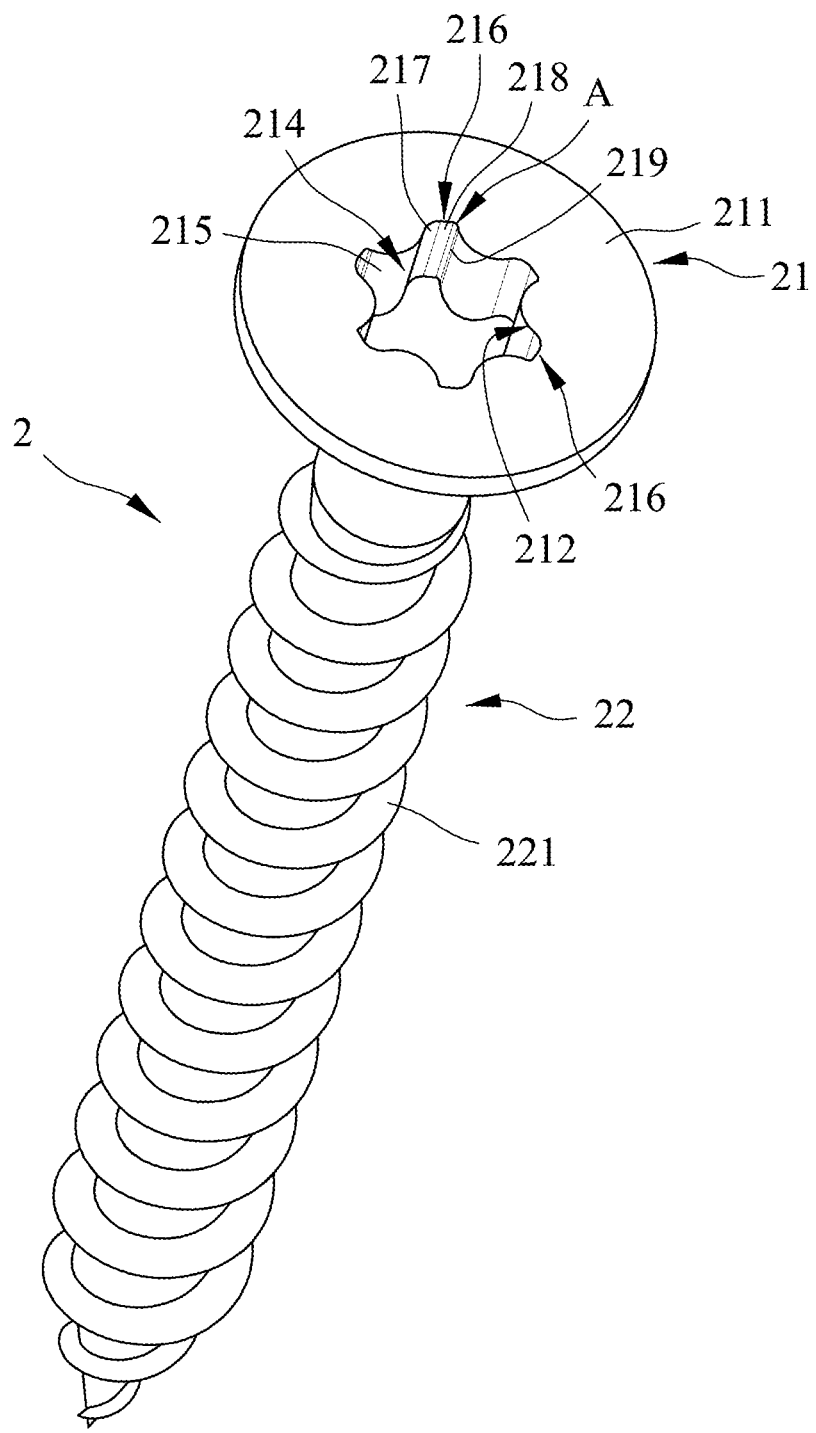
FIG. 3 is a perspective view illustrating the fastener.
Figure 4:
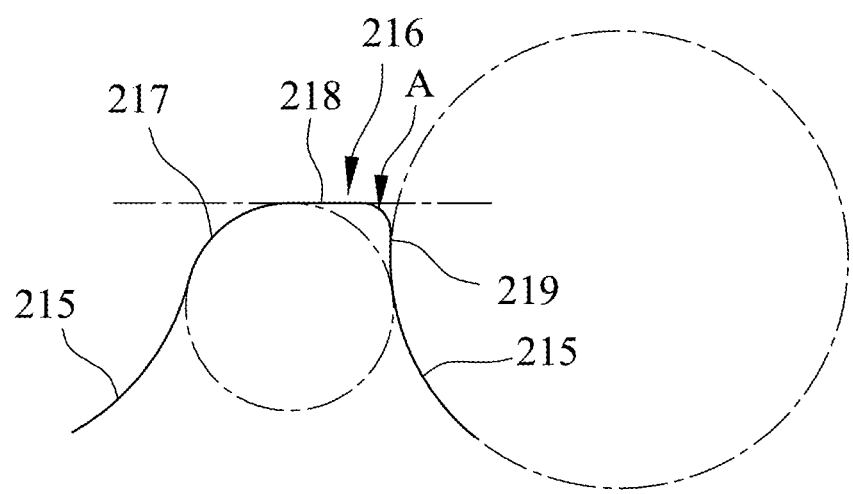
FIG. 4 is a schematic view illustrating a driven portion of the fastener.

Referring to FIGS. 2 to 4, an embodiment of the fastener 2 according to the disclosure includes a screw head 21, and a screw shank 22 that integrally extends downwardly from a bottom end of the screw head 21. The screw head 21 has a top surface 211, and an inner surrounding surface 212 that is connected to the top surface 211. The inner surrounding surface 212 defines a recess 214 that is recessed from the top surface 211. The inner surrounding surface 212 has six curved portions 215 and six driven portions 216 that are disposed about a central axis of the fastener 2 in an alternating arrangement. Each of the driven portions 216 has two opposite ends respectively connected to two of the curved portions 215 that are adjacent to the driven portion 216. Each of the driven portions 216 has a curved section 217 that is connected to one of the two adjacent curved portions 215 and that has a direction of curvature opposite to that of the one of the two adjacent curved portions 215, a straight section 218 that extends along a tangent line of an end of the curved section 217 distal from the one of the two adjacent curved portions 215, and an extension section 219 that is connected between the straight section 218 and the other one of the two adjacent curved portions 215. The extension section 219 may be configured as a straight surface or a curved surface, so an intersection (A, see FIG. 4) of the extension section 219 and the straight section 218 may be in the form of an acute angle, a right angle, an obtuse angle or a fillet. In the case that the intersection (A) of the extension section 219 and the straight section 218 is in the form of a fillet, stress may be uniformly distributed on the inner surrounding surface 212 when the fastener 2 is driven by a driver bit, so the inner surrounding surface 212 may be prevented from being damaged. An outer surrounding surface of the screw shank 22 is formed with a thread 221 that helically extends along the screw shank 22. In this embodiment, a radius of curvature of the curved portions 215 is greater than that of the curved sections 217 of the driven portions 216. In the case that the intersection (A) of the extension section 219 and the straight section 218 is in the form of a fillet, the radius of curvature of the curved sections 217 of the driven portions 216 is greater than a fillet radius of the intersection (A) of the extension section 219 and the straight section 218.

Figure 5:
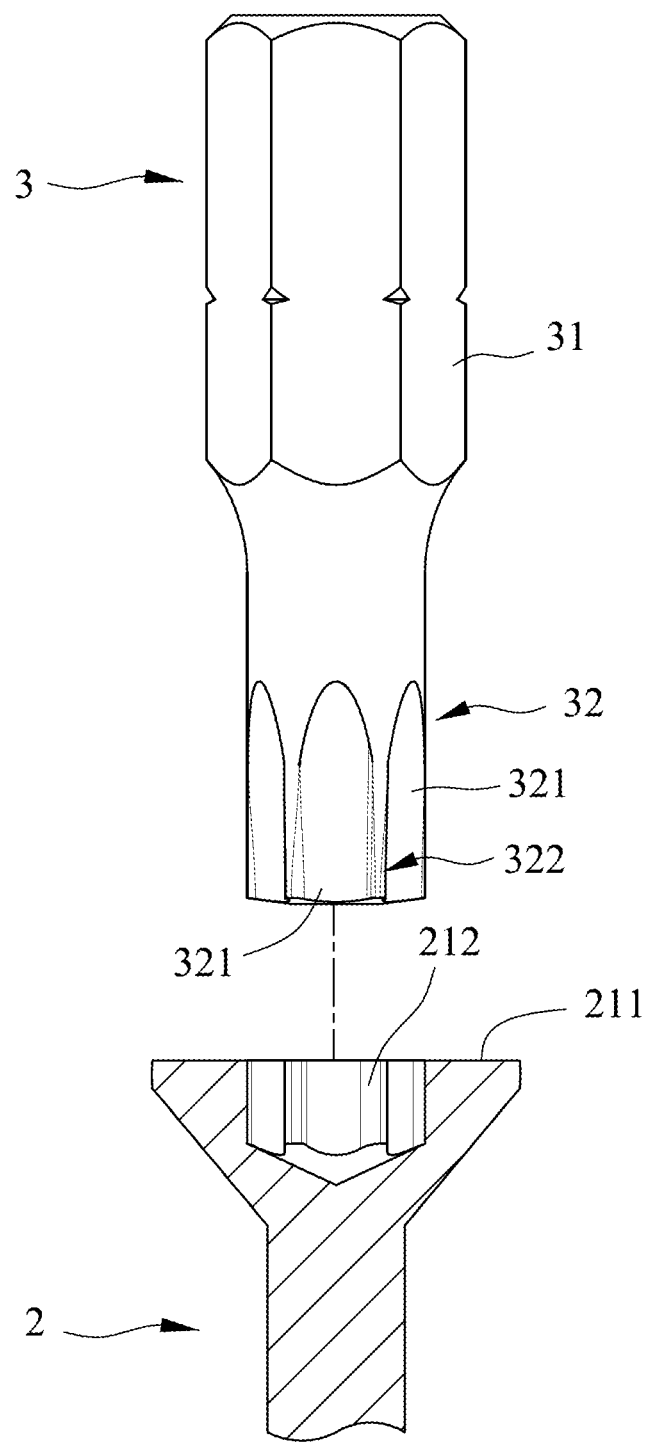
FIG. 5 is a side view illustrating an embodiment of the driver bit according to the disclosure.
Figure 6:
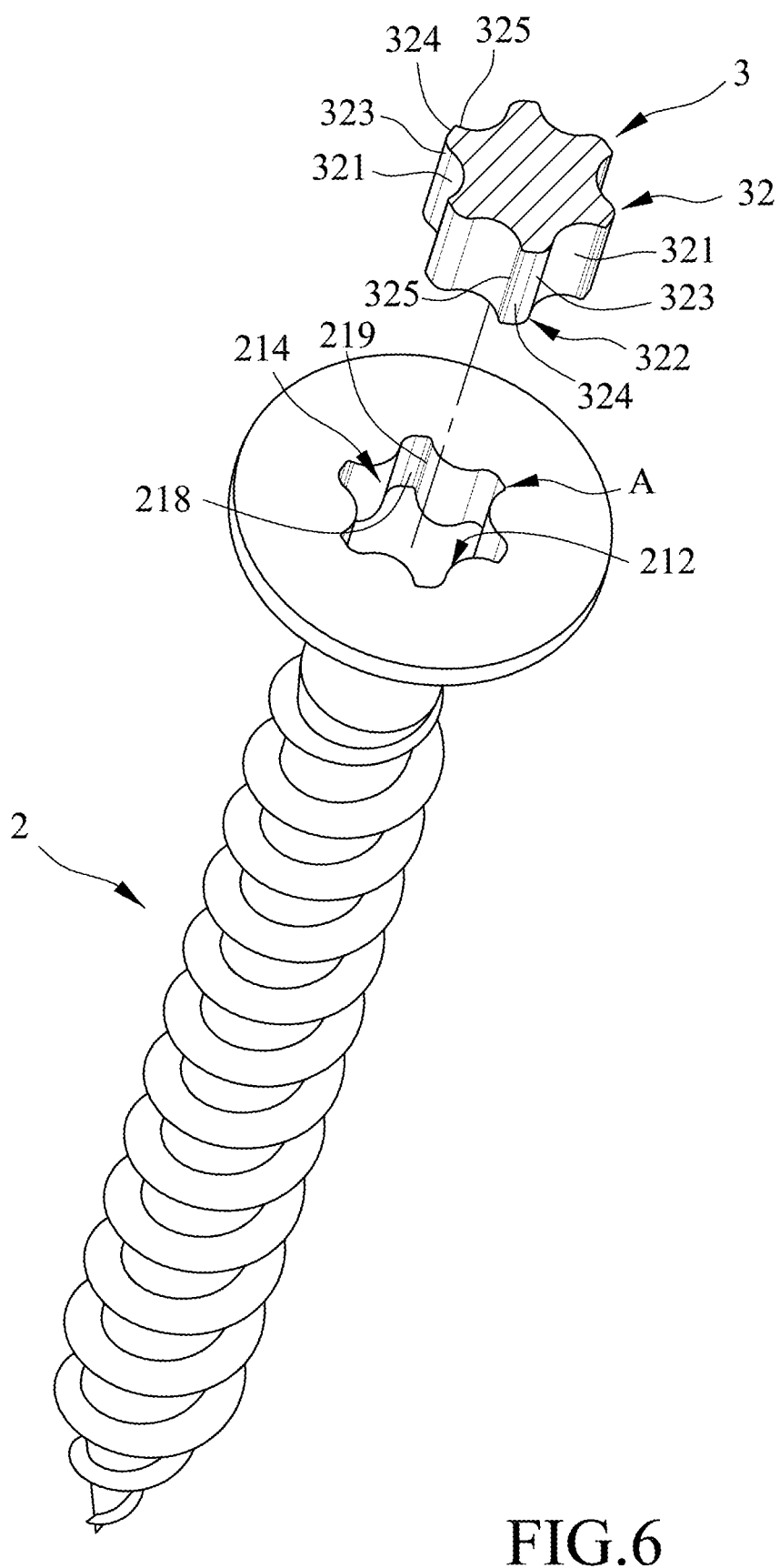
FIG. 6 is a fragmentary perspective view illustrating the driver bit and a fastener.
Figure 7:
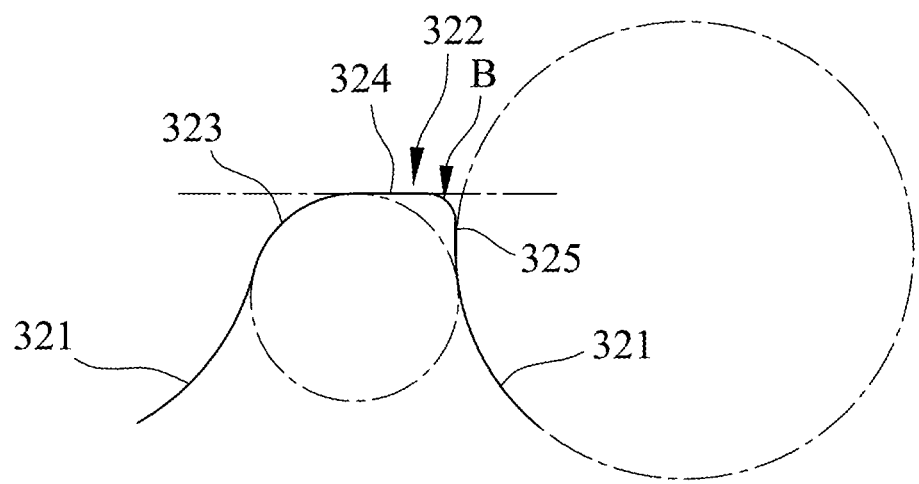
FIG. 7 is a schematic view illustrating a driving portion of the driver bit.

Referring to FIGS. 5 to 7, an embodiment of the driver bit 3 according to the disclosure is adapted for driving the fastener 2, and includes a connecting portion 31, and a driver head 32 that extends downwardly from the connecting portion 31. The driver head 32 has six curved portions 321 and six driving portions 322 that are disposed about a central axis of the driver bit 3 in an alternating arrangement. Each of the driving portions 322 has two opposite ends respectively connected to two of the curved portions 321 that are adjacent to the driving portion 322. Each of the driving portions 322 has a curved section 323 that is connected to one of the two adjacent curved portions 321 and that has a direction of curvature opposite to that of the one of the two adjacent curved portions 321, a straight section 324 that extends along a tangent line of an end of the curved section 323 distal from the one of the two adjacent curved portions 321, and an extension section 325 that is connected between the straight section 324 and the other one of the two adjacent curved portions 321. The extension section 325 may be configured to be straight or curved, so an intersection (B, see FIG. 7) of the extension section 325 and the straight section 324 may be in the form of an acute angle, a right angle, an obtuse angle or a fillet. In this embodiment, a radius of curvature of the curved portions 321 is greater than that of the curved sections 323 of the driving portions 322. In the case that the intersection (B) of the extension section 325 and the straight section 324 is in the form of a fillet, the radius of curvature of the curved sections 323 of the driving portions 322 is greater than a fillet radius of the intersection (B) of the extension section 325 and the straight section 324.

Figure 8:
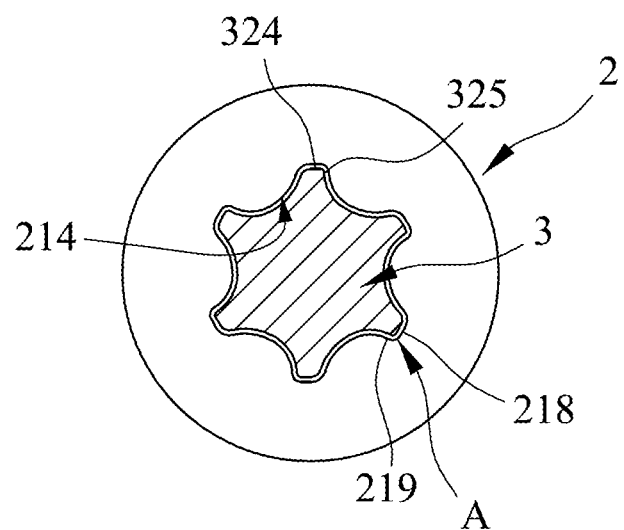
FIG. 8 is a sectional view illustrating engagement between the driver bit and the fastener.

Referring to FIGS. 5, 6 and 8, when the driver bit 3 is inserted into the recess 214 of the fastener 2, the extension sections 325 of the driver bit 3 respectively abut against the extension sections 219 of the fastener 2. By forming the extension sections 219 and the straight sections 218, a contact area between the driver bit 3 and the fastener 2 is increased. Although manufacturing tolerance exists in the driver bit 3 and the fastener 2, the driver bit 3 and the fastener 2 may be able to fittingly engage with each other by the presence of the extension sections 219 and the straight sections 218. As such, the driver bit 3 and the fastener 2 may not slip relative to each other, so that a torque exerted on the driver bit 3 can be sufficiently transmitted to the fastener 2, and the driver bit 3 and the inner surrounding surface 212 that defines the recess 214 may be prevented from abrasion and damage. Furthermore, corrosion on damaged portions of the fastener 2 resulting from the environment can be therefore prevented. Since the torque can be sufficiently transmitted from the driver bit 3 to the fastener 2, when the driver bit 3 is turned by a power tool, electric power can be efficiently used, and electricity consumption can be therefore reduced. Since the driver bit 3 is able to fittingly engage the recess 214 of the fastener 2, the fastener 2 may not fall off from the driver bit 3 easily. When a user manually turns or uses a power tool to turn the fastener 2 via the driver bit 3, which is attached to a hand tool or the power tool, with one hand, the fastener 2 need not be held in the other hand of the user. Therefore, the driver bit 3 and the fastener 2 are able to be operated by only one hand, easing the operation, and the driver bit 3 and the fastener 2 would not wobble relative to each other, enhancing the stability during operation. The intersections (A) formed by the extension sections 219 and the straight sections 218 facilitate insertion of the driver bit 3 into the recess 214 of the fastener 2 and positioning between the driver bit 3 and the fastener 2, and serve to prevent stress concentration and damage during the insertion of the driver bit 3 into the recess 214 of the fastener 2. In addition, when the fastener 2 is coated with a corrosion-resistant material, residual corrosion-resistant material may be accommodated in spaces formed in the intersections (A), so the residual corrosion-resistant material may not affect the insertion of the driver bit 3 into the recess 214 of the fastener 2. The drawback of the conventional fastener that the corrosion-resistant material would easily accumulate in the six-lobe recess to affect the engagement between the conventional fastener and a driver bit is alleviated.

Figure 9:
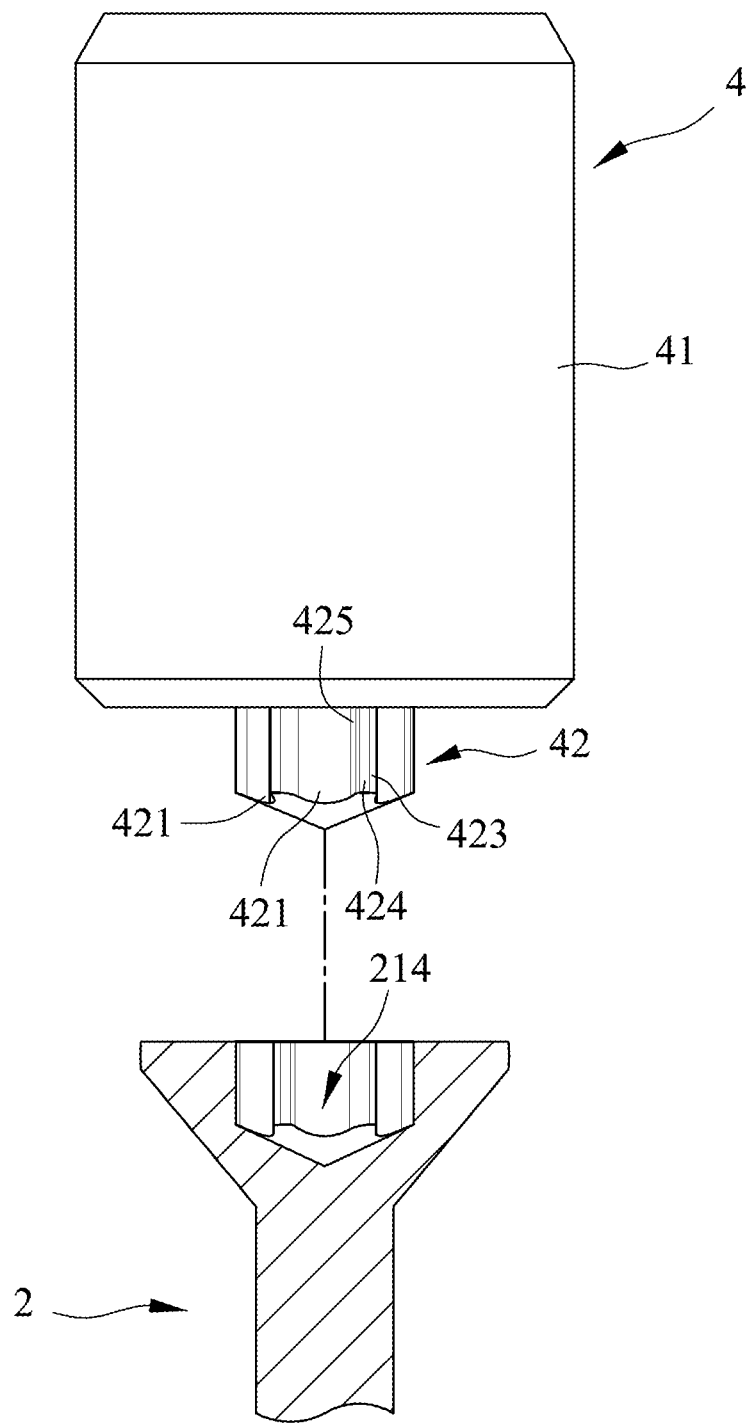
FIG. 9 is a side view illustrating an embodiment of the punch tool according to the disclosure.
Figure 10:
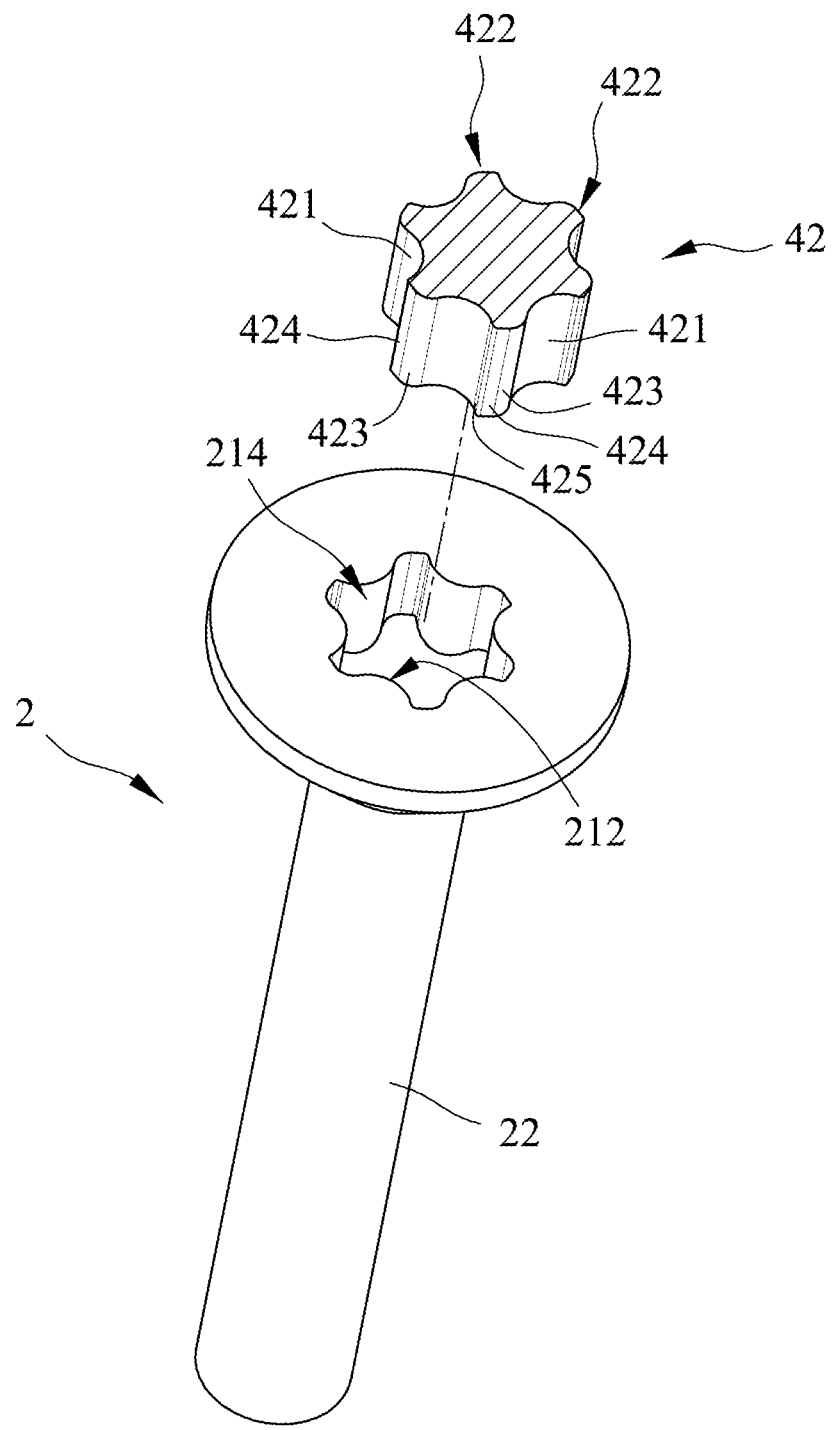
FIG. 10 is a fragmentary perspective view illustrating the punch tool and a fastener.
Figure 11:
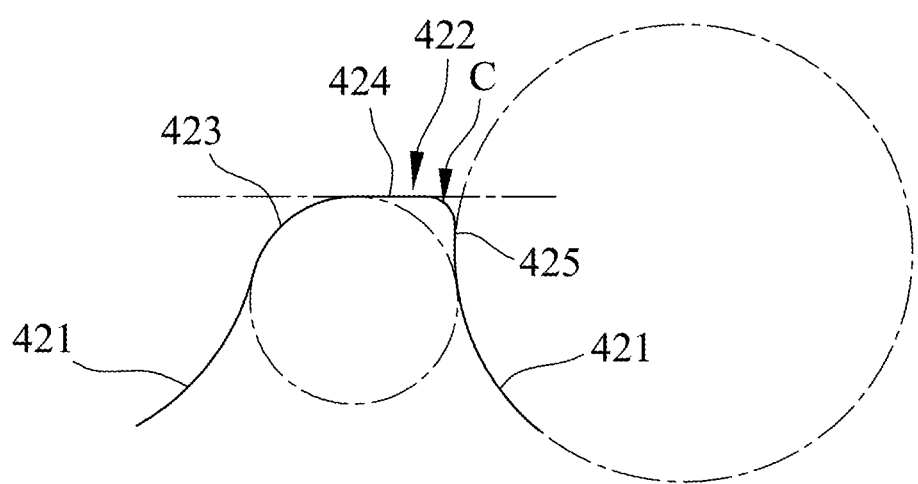
FIG. 11 is a schematic view illustrating a convex portion of the punch tool.

Referring to FIGS. 9 to 11, an embodiment of the punch tool 4 according to the disclosure is adapted for forming the fastener 2. The punch tool 4 has a main body 41, and a punch head 42 that extends downwardly from the main body 41 and that is adapted to form the recess 214 of the fastener 2. The punch head 42 has six curved portions 421 and six convex portions 422 that are disposed about a central axis of the punch tool 4 in an alternating arrangement. Each of the convex portions 422 has two opposite ends respectively connected to two of the curved portions 421 that are adjacent to the convex portion 422. Each of the convex portions 422 has a curved section 423 that is connected to one of the two adjacent curved portions 421 and that has a direction of curvature opposite to that of the one of the two adjacent curved portions 421, a straight section 424 that extends along a tangent line of an end of the curved section 423 distal from the one of the two adjacent curved portions 421, and an extension section 425 that is connected between the straight section 424 and the other one of the two adjacent curved portions 421. The extension section 425 may be configured to be straight or curved, so an intersection (C, see FIG. 11) of the extension section 425 and the straight section 424 may be in the form of an acute angle, a right angle, an obtuse angle or a fillet. In this embodiment, a radius of curvature of the curved portions 421 is greater than that of the curved sections 423 of the convex portions 422. In the case that the intersection (C) of the extension section 425 and the straight section 424 is in the form of a fillet, the radius of curvature of the curved sections 423 of the convex portions 422 is greater than a fillet radius of the intersection (C) of the extension section 425 and the straight section 424. With particular reference to FIG. 10, the recess 214 of the fastener 2 is formed by the punch head 42 before the screw shank 22 is threaded to form a helically-extending thread.

In summary, by virtue of the extension sections 219 and the straight sections 218, a contact area between the driver bit 3 and the fastener 2 is increased, and the driver bit 3 and the fastener 2 may be able to fittingly engage with each other. As such, the driver bit 3 and the fastener 2 may not slip relative to each other, so that a torque exerted on the driver bit 3 can be sufficiently transmitted to the fastener 2, and the driver bit 3 and the inner surrounding surface 212 that defines the recess 214 may not be damaged. Thus, the driver bit 3 and the fastener 2 can be easily operated, and service life of both the driver bit 3 and the fastener 2 can be extended.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A fastener comprising:
   a screw head having a top surface, and an inner surrounding surface that is connected to said top surface, said inner surrounding surface defining a recess that is recessed from said top surface, said inner surrounding surface having six curved portions and six driven portions that are disposed about a central axis of said fastener in an alternating arrangement, each of said driven portions having two opposite ends that are respectively connected to two of said curved portions adjacent to said driven portion, each of said driven portions having a curved section that is connected to one of said two of said curved portions and that has a direction of curvature opposite to said one of said two of said curved portions, a straight section that extends along a tangent line of an end of said curved section distal from said one of said two of said curved portions, and an extension section that is connected between said straight section and another one of said two of said curved portions; and
   a screw shank extending downwardly from said screw head, an outer surrounding surface of said screw shank being formed with a thread that helically extends along said screw shank;
   wherein an intersection formed between said extension section and said straight section of each of said driven portion is configured to be in a form of an acute angle, a right angle, an obtuse angle or a fillet;
   wherein a radius of curvature of said curved portions is greater than said curved sections of said driven portions, and the radius of curvature of said curved sections of said driven portions is greater than a fillet radius of said intersection formed between said extension section and said straight section of each of said driven portion; and
   wherein an osculating circle of said curved section of each of said driven portions is simultaneously tangent to osculating circles of said two of said curved portions adjacent to said driven portion.

2. The fastener as claimed in claim 1, wherein a radius of curvature of said curved portions is greater than said curved sections of said driven portions.

3. The fastener as claimed in claim 1, wherein said extension section of each of said driven portions is configured as one of a straight surface and a curved surface.

* * * * *